United States Patent [19]
Palmer et al.

[11] Patent Number: 5,905,865
[45] Date of Patent: May 18, 1999

[54] APPARATUS AND METHOD OF AUTOMATICALLY ACCESSING ON-LINE SERVICES IN RESPONSE TO BROADCAST OF ON-LINE ADDRESSES

[75] Inventors: Shelton L. Palmer, New York; Jason M. Palmer, Huntington Bay, both of N.Y.

[73] Assignee: Web Pager, Inc., New York, N.Y.

[21] Appl. No.: 08/739,796

[22] Filed: Oct. 30, 1996

Related U.S. Application Data

[60] Provisional application No. 60/008,111, Oct. 30, 1995.

[51] Int. Cl.$^6$ .................................................. G06F 19/00
[52] U.S. Cl. .............................. 395/200.47; 395/200.48; 395/200.49; 395/200.57; 395/200.59; 455/3.1; 455/3.2; 455/4.1; 707/10; 707/104
[58] Field of Search .......................... 395/200.46–200.49, 395/200.55–200.6; 348/6, 7, 12, 13; 379/88, 89; 455/4.2, 5.1, 3.1, 3.2, 4.1; 707/10, 104

[56] References Cited

U.S. PATENT DOCUMENTS

| | | | |
|---|---|---|---|
| 5,276,866 | 1/1994 | Paolini | 395/200.49 |
| 5,438,355 | 8/1995 | Palmer | 348/1 |
| 5,572,442 | 11/1996 | Schulhof et al. | 395/200.49 |
| 5,572,643 | 11/1996 | Judson | 395/200.48 |
| 5,657,450 | 8/1997 | Rao et al. | 395/200.47 |
| 5,721,829 | 2/1998 | Dunn et al. | 395/200.49 |
| 5,737,532 | 4/1998 | DeLair et al. | 395/200.49 |
| 5,794,250 | 8/1998 | Carino, Jr. et al. | 707/104 |

OTHER PUBLICATIONS

Website pages of "AirMedia Live Internet Broadcast Network", printed Oct. 7, 1996.
AirMedia Live Wireless Network Service Plans brochure, © 1996.
Website pages of "PageCard Wireless Messaging System For Windows", Socket Communications printed Oct. 24, 1996.
Walter S. Mossberos, "Personal Technology", Printed Oct. 24, 1996.

Primary Examiner—Zarni Maung
Assistant Examiner—Bharat Barot
Attorney, Agent, or Firm—Lerner, David, Littenberg, Krumholz & Mentlik, LLP

[57] ABSTRACT

A method and apparatus is provided for connecting a computer to electronic addresses in sync with an audio/video broadcast. Simultaneously with the broadcasting of audio/video programming, an address transmitter transmits an address, such as a URL, identifying an on-line service which contains information about the audio or video programming. This address is received by a computer and used to automatically access the on-line service. Preferably, the process is repeated with different addresses corresponding with different programming. It is also preferred that the addresses be sent via a paging system.

38 Claims, 1 Drawing Sheet

APPARATUS AND METHOD OF AUTOMATICALLY ACCESSING ON-LINE SERVICES IN RESPONSE TO BROADCAST OF ON-LINE ADDRESSES

This application claims benefit of provisional application Ser. No. 60/008,111 filed Oct. 30, 1995.

BACKGROUND OF THE INVENTION

Although both television programming and the Internet have undergone an explosion of content, the two have essentially expanded and developed independently. There have been relatively few successful attempts to marry these two areas of communication. Accordingly, despite the vast business opportunities afforded by television, the potential of exploiting or enhancing revenues via the Internet has been largely untapped. The same is true with respect to radio stations, which are being all but left out of the information revolution.

Although some efforts have made to made to link these two areas, these efforts have suffered from disadvantages. Users can often obtain more information about their favorite programming or station by accessing a website on the World Wide Web which is dedicated to that programming. However, while the website may contain useful information which is of interest to the user, the user has to overcome a number of obstacles to get to that website. The user must first obtain an electronic address such as a Uniform Resource Locators ("URL") for the website and enter that electronic address exactly into the user's computer. These addresses are often long and complicated. These inconveniences can dissuade those who would otherwise be interested in finding programming information on the Internet.

Another manner in which broadcast programming and the Internet have been linked is allowing users to electronically communicate via the Internet with a live broadcast show. The television programming may change in response to the information being sent to the broadcaster, such as by broadcasting a transcript of the messages sent. Again, however, this method also requires the user to know and correctly use the appropriate URL.

Further, the foregoing efforts to link broadcast programming with the Internet also require that the user stay connected to one particular website. If the user wishes to find information on the Internet which is associated with different programming, they are required to change websites and undergo the same inconveniences of finding and entering the appropriate URL.

It would be advantageous, therefore, if there were a method and apparatus which saved the user the difficulty of finding and entering proper on-line electronic addresses associated with broadcast programming. There is an accompanying need for a method and apparatus which automatically connects the computer to different addresses as the programming changes.

SUMMARY OF THE INVENTION

The present invention addresses these needs.

In one preferred embodiment of the present invention, a method is provided for connecting a computer with multiple on-line services simultaneously with an audio and/or video broadcast. The method comprises the steps of providing a computer located at a first location and an on-line service located at a second location remote to the first location and broadcasting audio or video programming. Another step includes transmitting an address identifying the on-line service from an address transmitter at a third location remote from the first and second locations. The on-line service contains information corresponding with the audio or video programming being broadcast at the time the address is transmitted. Further, the step of transmitting occurs simultaneously with the step of broadcasting, and the method also includes receiving the address at the computer, such that the computer automatically accesses the on-line service by using the address information.

Preferably, the address is a Universal Resource Locator and the on-line service is an Internet Service Provider which provides access to a website. The website sends information to the computer. The address may also identify a portion of the information contained in the on-line service, with the step of connecting the computer to the on-line service occurring before the step of receiving.

The step of automatically accessing the on-line service desirably includes sending the address via a modem and telephone lines to connect the computer with the on-line service. The on-line service may count the amount of times it has been accessed by the particular computer or any computer.

It is preferred that the transmission of addresses occur via electromagnetic waves, such as over a paging system. Alternatively, the addresses may be sent from an audio or video playback device such as a VCR or the like. On the other hand, the address transmitter may be a website and the step of transmitting comprises sending the address to the computer via the Internet. Yet further, the address transmitter may be an audio/visual broadcaster, such that the address transmitter also transmits television or radio signals.

In another preferred embodiment of the invention, a method is provided for directing computers located at a plurality of different first locations to communicate with an on-line service, the on-line service being located at a second location remote from the first locations. The method includes transmitting an address identifying the on-line service from a transmitter at a third location (remote from the first and second locations) to the plurality of the computers. Another step includes broadcasting audio or video information corresponding with the address simultaneous with the step of transmitting, and simultaneously receiving the address at the plurality of computers. At least one of the computers uses the address to access the on-line service.

Preferably, the transmitting step includes transmitting the address by modulating an electromagnetic wave which has a carrier frequency associated with a television or radio signal, with the audio and/or video information being broadcast at the same carrier frequency. Alternatively, the audio and/or video information may be transmitted at a different carrier frequency. The on-line service provides information related to the audio and/or video information to the computer. The audio and/or video information may be provided to the computer before, during or after the step of accessing.

Yet another preferred embodiment of the present invention provides a method of directing computers located at a plurality of different first locations to communicate with an on-line service, the on-line service being located at a second location remote from the first locations. The method comprises: transmitting an address from a transmitter at a third location (remote to the first and second location) to the plurality of computers; simultaneously receiving the address at the plurality of computers; broadcasting audio and/or video information corresponding with the address simultaneously with the step of transmitting; using the address so that at least one of the computers accesses the on-line service; and sending information from the computer to the on-line service in response after the computer accesses the on-line service.

Desirably, the method also includes the step of modifying the audio or video information in response to the response information. More steps would include repeating the process with different addresses identifying different on-line services and then storing those different addresses in the computer. The information would then be accessed at a time after the addresses were stored.

An additional preferred embodiment provides a method of directing a computer at a first location to communicate with a first on-line service identified by a first address and a second on-line service identified by a second address. The steps include broadcasting first audio or video programming corresponding with the first on-line service simultaneously with the step of transmitting the first address; receiving the first address at the computer; transmitting the second address from the address transmitter; broadcasting second audio or video programming corresponding with the second on-line service simultaneously with the step of transmitting the second address; receiving the second address at the computer; the computer automatically accessing the first on-line service by using the first address and automatically accessing the second on-line service by using the second address.

Yet another preferred embodiment provides a method of directing a computer to access information related to radio or television programming currently being broadcast comprising transmitting an address identifying an on-line service from a paging system; receiving the address at the computer; automatically accessing the on-line service by using the address; and receiving information related to the radio or television programming.

A system in accordance with the preferred embodiment connects a computer with multiple on-line services. The system includes an audio or video programming broadcaster and a receiver for receiving different addresses identifying the on-line services, whereby the addresses are transmitted simultaneously with the programming being broadcast by the broadcaster and the on-line services contain information corresponding with the programming.

DETAILED DESCRIPTION OF THE PREFERRED EMBODIMENT

Figure 1:
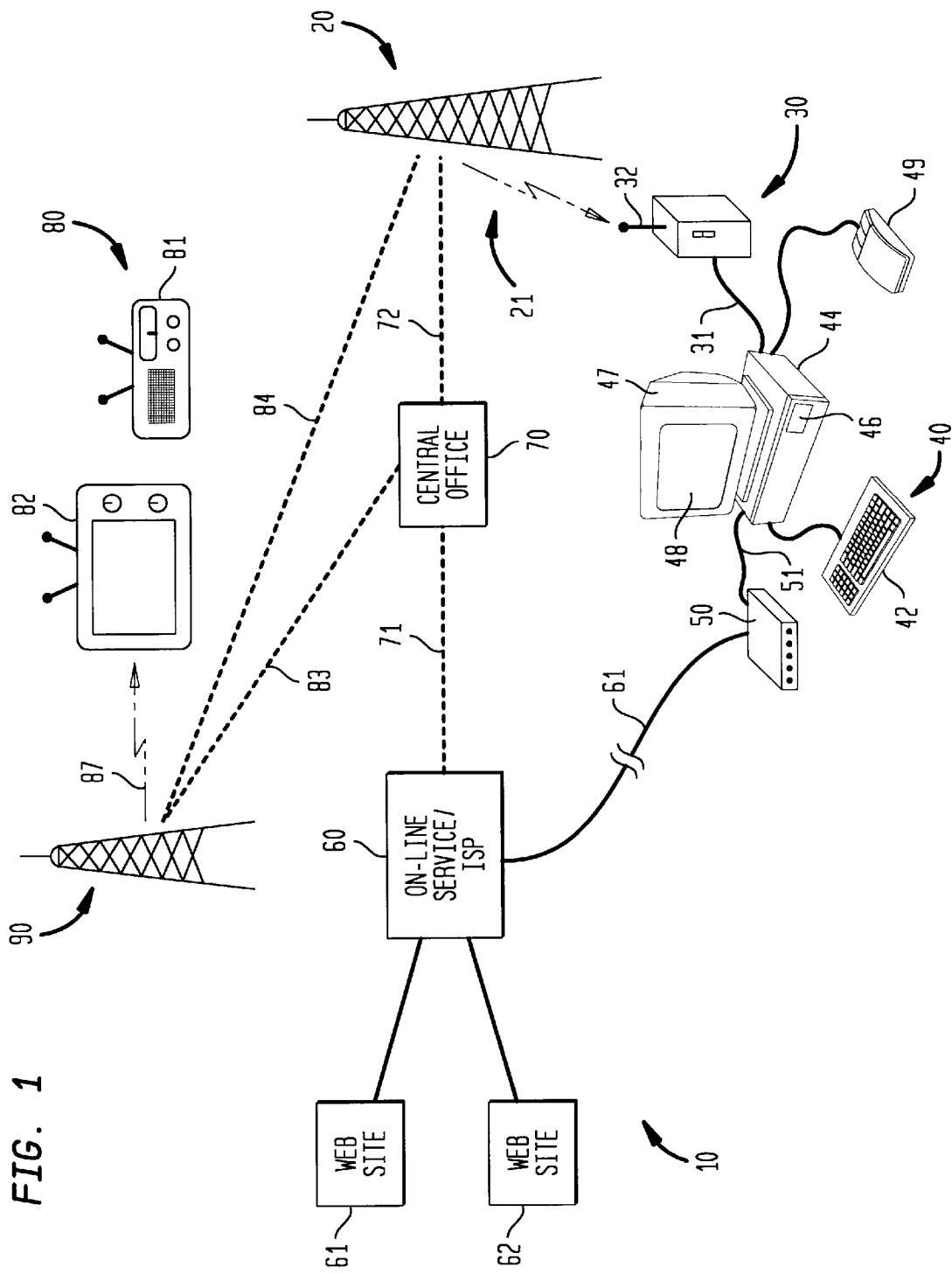
FIG. 1 is a schematic view of a system in accordance with the present invention.

FIG. 1 shows a system 10 in accordance with one embodiment of the present invention. The system comprises a general computer 40, a receiver 30, an on-line service 60, a central office 70, television/radio broadcaster 90, a radio and/or television 80 and a transmitter 20.

General computer 40 includes a processor unit 44 containing a microprocessor (not shown) and a memory storage device such as hard-drive 46. A plurality of input/output peripherals are connected to the processor unit 44 including monitor 47 having a screen 48, keyboard 42, modem 50 (connected to processor unit 44 via cable 51) and mouse 49. The general computer 40 and its associated peripherals may be any of the standard personal computers currently available, such as an IBM-compatible personal computer operating under the Windows platform. In the preferred embodiment, the computer includes a program which performs the steps outlined below.

Receiver 30 is connected to processor unit 44 via cable 31. Receiver 30 is preferably an alpha-numeric pager/beeper unit, which is capable of receiving alpha-numeric information via a page. Receiver 30 includes an antenna 32 and outputs the pages it receives via cable 31 to computer 40. Pagers/beepers capable of outputting received alpha-numeric messages to a computer are currently available, including the PageCard Wireless Messaging System offered by Socket Communications, Inc. of Fremont, Calif.

Modem 50 is connected to a telephone line 61 as well as processor 44. The modem preferably connects with a POTS/Centrex telephone line in a manner well-known and standard to modems. The modem may alternatively be connected via ISDN, leased line, or cable modem.

An on-line service 60 is also connected to the phone network. Preferably, the on-line service is an Internet Service Provider which is capable of connecting the general computer 40 to the Internet via modem 50. The on-line service is at a physical location remote from the computer, i.e. the on-line service and computer are connected only by a communication medium such as the phone system. As used herein, the term remote means being separated by a physical distance of any length in addition to the term's ordinary meaning. The Internet Service Provider, in turn, allows Internet connections to websites/on-line services 61 and 62 which are remote from the other components of the system 10.

The system also includes two broadcasters which are located at locations remote from the other components: radio and television broadcaster 90 and paging system broadcaster 20. In manners well known in the art, radio/television broadcaster 90 broadcasts its programs via electromagnetic signals 87 to television 82 and/or radio 81. Likewise, pager broadcaster 20 broadcasts alpha-numeric pages via electromagnetic signals 21 to pagers and beepers. As is typical with such paging systems, the page can be sent on multiple frequencies and include information embedded in the signal which identifies the one or more beepers intended to receive the message.

Central office 70 maintains contact with on-line service 60 via any electronic connection 71 such as the Internet or standard telephone lines. Central office 70 maintains similar communication connections 72 and 83 with the pager and programming broadcasters 20 and 90, respectively. Preferably, the central office is another website. Central office 70 is used to help coordinate the various activities of the components of the system. However, as many of these activities may be planned in advance as shown below, central office 70 is not necessary to implementation of the invention.

In operation, paging system tower 20 broadcasts a page intended for reception by receiver 30. The request for the page may have originated from either the central office 70 or from the radio/television broadcaster 90, with the page request being sent by telephone lines. The receiver 30 receives the transmitted paged message and outputs the message to the processor 44 via cable 31.

The general computer handles the page in accordance with the dictates of the program. The program continuously monitors and/or polls receiver 30 to determine whether any pages have been received, such as by monitoring the processor's COM port connected to receiver 30 via wire 31. When a page has been detected as received, the program tests the page to determine whether it includes a valid URL. By way of example, a valid URL might be "http://www.palmer.net" which is the URL for website 61. If the message is a valid URL, the program stores the URL in memory such as by writing it onto hard drive 46.

The processor 44 next causes modem 50 to connect computer 40 with the Internet Service Provider 60 (if not already connected) via telephone line 61. Using functions typically present in a web browser, the program then sends the stored URL to the Internet Service Provider 60 which in turn allows the computer 40 to receive information from and interact with the website associated with the URL. The information received from website 61 will be displayed on screen 48. The program repeats the process each time a new and different URL is received by receiver 30, such as when the URL for website 62 is transmitted. Alternatively, the next URL may be another webpage of the current website 61. Accordingly, it is preferable for the program to be a World Wide Web compatible browser (Mosaic, Netscape or Microsoft Internet Explorer) with the remaining aspects of receiving and testing incoming URL's being a TSR (Temporary Stay Resident), DLL (Dynamic Link Library) or "plug-in", i.e., specific software code useable by a web browser.

In the preferred embodiment, the URL's are broadcast over the paging system to correspond with the programming broadcasted for radio or televisions. For example, every time a commercial is shown on television 82, a URL associated with that advertiser's website is simultaneously sent from tower 20 to receiver 30. That website may be the advertiser's home page. The tower 20 then sends out the address of a different website when the next commercial begins. Thus, computer screen 48 displays different information from different websites to simultaneously correspond with television or radio programming. The computer connects with the different websites automatically and in relatively synchronously with the broadcast signals. The broadcaster, in effect, controls the Internet destination of the user's computer. This turns the receiver's computer into a directed video kiosk controlled and programmed by the television or radio broadcasters. As paging and phone systems are essentially ubiquitous, there is essentially no geographical limit to the invention. Although the sending and receiving of audio/visual information and URL's should be simultaneous, the URL actually may be accessed during or after the audio/video signal.

Central office 70 coordinates the activities between paging system 20 and programming broadcaster 90. The radio and television stations may provide the central office with a schedule of programming and the associated URL's. In accordance with those schedules, the central office sends page requests to the paging system via the telephone lines or Internet at predetermined times. For any radio and television programming where it is difficult to predict when the ULR's should be simulcast with the broadcast programming, such as live broadcasts, the station 90 may send its URL page requests either to central office 70 or directly to paging system 20 (as referenced by line 84 of FIG. 1) in relative synchronicity and real-time with the programming. Yet further, the station may inform the central office of what URL's should be paged by embedding the information right in its broadcast. For example, the URL may be embedded in the vertical blanking interval, sideband or alternative band or channel of the broadcast and extracted by the central office 70.

In another preferred embodiment, the URL messages are not broadcast via a paging system but are instead sent over the Internet. For instance, the computer 40 uses a first web browser to connect with central office 70 over the Internet, and receives a steady stream of URL locations from central office 70. These locations are provided to a second web browser running on computer 40 which connects with different websites as noted above. Thus, by running the first web browser connected to the central office in the background or "minimized", the second web browser will continuously update the screen with changing information.

The present invention allows a wide variety of other options which increases its versatility to meet a user's particular needs. For example, the user can run the program in two modes, namely "auto-pilot" and "history-stack". In the auto-pilot mode, the computer automatically connects to a website the moment the website's URL is received by receiver 30, as explained above. In history-stack mode, on the other hand, the computer does not immediately connect to a website upon receipt of a URL. Rather, the URL's are stacked on hard drive 46 to be used at a later time and order chosen by the user. In order to access any of the websites, the user need do no more than select one of the URL's which have been stored in memory. The user does not have to enter any electronic addresses. To fully bring out the value of history-stack mode, it is recommended to add information to the transmitted URL messages, i.e. an English description of the URL. For example, the transmitted message might be "http://www.palmer.net Palmer Computer Services, Inc. Home Page", where the first portion of the message is the URL used by the web browser and the second portion of the message is displayed by the program so the user can understand what the website is about.

While in auto-pilot mode, the program allows the user to interrupt the automatic connection to websites by clicking anywhere in a given web page or by pressing a key on the keyboard or other applicable user controlled input device. When the user opts out of auto-pilot mode, the program automatically switches to history-stack mode so that the user can return to the websites which were missed while reviewing the paused website. The user may switch back to auto-pilot mode at any time.

The program can also be configured to automatically switch between auto-pilot and history-stack modes upon the occurrence of predetermined events such as expiration of timers or connection to specific websites. For example, the program may switch from auto-pilot mode to history-stack mode and wait for a user response when the program detects certain information, such as connection to a website offering a contest entry form.

The invention is uniquely suited to capitalize on and add value to traditional broadcasts by manipulating Internet connections. Advertising is enhanced by making more complete information and options available to potential buyers. By way of example, the system can promote direct response selling such as taking users to specific web sites in sync with radio broadcasts. While a song is playing on the radio, the computer may simultaneously connect to a website which allows the user to immediately order the artist's CD. Thus, the user can order a product over the Internet with relatively minimal effort and without knowing or typing any specific electronic addresses. The website (or page) changes when the song changes, offering yet another selling opportunity. Alternatively, potential buyers may be directed to on-line chat areas to ask live salespeople questions about the products being transmitted over the broadcast. Further, where technology permits, an Internet telephone call can be created between the user and the content provider.

A variety of other sales opportunities are also presented. Options include making coupons available to users in sync with commercials. Special-offer and limited-time sales are also possible by offering discounts and incentives to those customers who quickly respond to a commercial via Internet. Contest entries are similarly available. The broadcast may also be modified in response to the information received, such as by announcing contest winners or number of purchasers.

The invention may also be used to add an additional dimension to traditional broadcast programming. Text, graphics, movies and other computerized information can automatically be sent to user's computers while they are watching a program. For example, a radio broadcast may be supplemented by transmitting a video to the computer during the broadcast, creating a pseudo-television show out of a radio broadcast. Relatedly, a text-based website can come alive with real-time broadcast radio or television. Game shows can add text, graphics and movies to their programs and still direct the user to its advertiser's websites during commercial breaks.

If the websites are advertiser home pages, the home pages may audit the number of "hits" received. Not only will this information enable the advertiser to confirm the level of activity on its website, but the advertising fees may be based on the number of hits. Just by virtue of the user's computer visiting the home page, an accurate count can be obtained of the number of gross broadcast impressions that were generated by the system technology.

The receiver may also cooperate with the computer to automatically save or access only websites meeting certain profile information. For example, the user may complete a profile indicating certain preferences, such as desire to be automatically entered in all contests, receive all coupon offers for laundry soap or receive all information from a specific automobile advertiser. This profile may be stored in the individual computer 40 so that the program uses the profile to filter out unwanted URL's. Alternatively, the profile may be stored at the central office 70 and a page sent to only to those particular receivers and users which have indicated an interest in receiving the information. For example, central office 70 may store a list of the receivers 30 which want certain information, so that the central office only sends pages to those particular receivers. Although all the receivers 30 might be physically capable of accepting the signal, not all will take the next step and make a connection with the associated on-line service.

The system is flexible enough to encompass a variety of alternatives. For example, the address need not be a URL and the intended on-line service a website. Rather the address and intended on-line service could be a phone number to a BBS, an electronic address to another aspect of the Internet (FTP, Gopher, WAIS, WWW, NewsGroups, Lists) or a phone number to a general information provider such as CompuServe, America Online or the like.

Additionally, the general computer may be any device capable of accessing the Internet and its related services such as an Intel-based (IBM-PC and compatible running under DOS or Windows) or a Motorola-based (Apple Macintosh, Apple PowerMac) personal computer. The computer may also be one of the more powerful workstation class computers (Sun, MIPS, Hewlett Packard) or a mini or main-frame computer (IBM RS/6000, AS/400, System/390, DEC VAX). If modified by appropriate hardware and software to allow access to the Internet, other dedicated computers may also be used such as game machines (Sega Genesis, Nintendo Game Boy) and electronic organizers and pen-based computers (Sharp Wizard, Casio B.O.S.S., Apple Newton, Psion). Additionally, specialized telecommunications devices and multi-function terminals provided for home banking, shopping and access to other information services and the like which are modified to access Internet may also be used.

The transmitter 20 is also not limited to paging networks. For example, the transmitter may a traditional television broadcaster, an AM, FM or HAM radio station, a digital direct satellite, video playback systems such as video cassette recorders/players or laser disc players, audio playback systems such as stereos and compact disc players and all other forms of digital, analog, or hybrid transmission capable of storing or embedding and transmitting alpha-numeric electronic addresses. For example, the URL may be stored in the vertical blanking interval of a television broadcast or sent on the video broadcast's carrier signal much like closed-captioning. Just as closed-captioning is extracted from the signal as an alpha-numeric message, so may the URL be extracted by receiver 30 and provided to the computer. However, in the preferred embodiment of a paging system, the carrier frequency of the broadcasted URL is different than the carrier frequency of the radio or television broadcast. The means of transmission may be by wire, wireless, optical or electromagnetic.

The hardware of the receiver will change with the nature of the transmission and also may include a number of alternatives. For example, the receiver is preferably tunable via software and/or hardware. The receiver is also preferably keyed so that it may receive different classes of pages depending upon the profile of the user. The receiver may be an FM receiver with a UART and asynchronous serial port operating at a baud rate compatible with most computer serial ports.

The subject matter of provisional application no. 60/008, 111 is incorporated herein by reference.

Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A method for connecting a computer with one or more on-line services providing information corresponding to audio or video programming being broadcasted comprising:
   a) providing a computer located at a first location and an on-line service located at a second location remote to said first location,
   b) broadcasting from a programming transmitter audio or video programming to one or more audio or video receivers,
   c) receiving an address identifying said on-line service at an address transmitter from said programming transmitter or from a central office,
   d) transmitting said address identifying said on-line service from said address transmitter at a third location remote from said first and second locations, said on-line service providing information corresponding with the audio or video programming being broadcast from said programming transmitter at the time said address is transmitted,
   e) coordinating said step of transmitting to occur simultaneously with said step of broadcasting, independent of user interaction with said on-line service,
   f) receiving said transmitted address at said computer, and g) automatically accessing said on-line service by said computer using said address identifying said on-line service.

2. The method of claim 1 wherein said address is a Universal Resource Locator and said on-line service is a website.

3. The method of claim 2 wherein said on-line service further comprises an Internet Service Provider providing access to said website.

4. The method of claim 2 wherein said on-line service at said address sends information to said computer.

5. The method of claim 4 wherein said step of automatically accessing said on-line service comprises sending said address via telephone lines to connect with said on-line service.

6. The method of claim 5 wherein said step of accessing comprises connecting said computer to said on-line service via a modem connected to said computer.

7. The method of claim 1 wherein said address identifies a portion of the information contained in said on-line service, and wherein said step of connecting said computer to said on-line service occurs before said step of receiving.

8. The method of claim 1 further comprising determining the amount of times said computer accesses said on-line service.

9. The method of claim 1 wherein said transmission of addresses occurs via electromagnetic waves.

10. The method of claim 9 wherein said address transmitter is a paging system.

11. The method of claim 9 wherein said address transmitter further transmits television or radio signals.

12. The method of claim 1 wherein said address transmitter is an audio or video playback device.

13. The method of claim 1 wherein said address transmitter is a website and said step of transmitting comprises sending said address to said computer via the Internet.

14. The method of claim 1 wherein said step of receiving said address occurs in relative synchronicity and in real-time with the step of broadcasting said audio or video programming.

15. The method of claim 14 wherein said step of receiving said address occurs simultaneously with said step of broadcasting said audio or video programming.

16. The method of claim 1 wherein said step of receiving said address includes receiving a predetermined schedule of programming of said audio or video programming.

17. A method of automatically directing computers located at a plurality of different first locations to communicate with an on-line service providing information corresponding to audio or video programming being broadcasted, said on-line service being located at a second location remote from said first locations, comprising:

a) receiving an address identifying said on-line service at an address transmitter from a programming transmitter or from a central office, b) transmitting said address from said address transmitter at a third location independent of said on-line service to said plurality of said computers, said third location being remote from said first and second locations and said address identifying said on-line service, c) broadcasting from said programming transmitter audio or video information corresponding with said on-line service, d) coordinating said step of transmitting to occur simultaneously with said step of broadcasting, independent of user interaction with said on-line service, e) simultaneously receiving said transmitted address at said plurality of computers, and f) automatically accessing said on-line service by at least some of said plurality of computers using said address identifying said on-line service.

18. The method of claim 17 wherein said step of transmitting includes transmitting said address by modulating an electromagnetic wave which has a carrier frequency associated with a television or radio signal.

19. The method of claim 18 wherein said audio or video information is broadcast at said same carrier frequency.

20. The method of claim 17 wherein said steps of transmitting includes transmitting said address by modulating an electromagnetic wave which has a first carrier frequency, and further comprising the step of transmitting audio and/or video information at a second carrier frequency different than said first carrier frequency.

21. The method of claims 18 or 20 wherein said audio or video information is provided to said computer before said step of accessing.

22. The method of claims 18 or 20 wherein said audio and/or video information is provided to said computer during said step of accessing.

23. The method of claims 18 or 20 wherein said audio and/or video information is provided to said computer after said step of accessing.

24. The method of claim 17 wherein said step of receiving said address occurs in relative synchronicity and in real-time with the step of broadcasting said audio or video programming.

25. The method of claim 24 wherein said step of receiving said address occurs simultaneously with said step of broadcasting said audio or video programming.

26. The method of claim 17 wherein said step of receiving includes receiving a predetermined schedule of programming of said audio or video programming.

27. A method of automatically directing computers located at a plurality of different first locations to communicate with an on-line service providing information corresponding to audio or video programming being broadcasted, said on-line service being located at a second location remote from said first locations, comprising:

a) receiving an address identifying said on-line service at an address transmitter from a programming transmitter or from a central office, b) transmitting said address from said address transmitter at a third location to said plurality of said computers, said third location being more remote from said first and second locations and said address identifying the on-line location of said on-line service, c) simultaneously receiving said transmitted address at said plurality of computers, d) broadcasting from said programming transmitter audio or video information corresponding with said on-line service, c) coordinating said step of transmitting to occur simultaneously with said step of broadcasting, independent of user interaction with said on-line service, f) at least one of said computers using said address to automatically access said on-line service, and g) sending response information from said computer to said on-line service after said computer accesses said on-line service.

28. The method of claim 27 further comprising modifying said audio or video information in response to said response information.

29. The method of claim 27 further comprising repeating said steps of transmitting and receiving by using different addresses identifying different on-line services, and storing a plurality of said different addresses in said computer before said step of accessing.

30. The method of claim 27 wherein said step of receiving said address occurs in relative synchronicity and in real-time with the step of broadcasting of said audio or video programming.

31. The method of claim 30 wherein said step of receiving said address occurs simultaneously with said step of broadcasting said audio or video programming.

32. The method of claim 27 wherein said step of receiving includes receiving a predetermined schedule of programming of said audio or video programming.

33. A method of directing a computer at a first location to automatically communicate with a first on-line service identified by a first address and with a plurality of subsequent on-line services identified by subsequent addresses, said first and subsequent addresses providing information corresponding to audio or video programming being broadcasted, each on-line service being located at a location remote from said first location, said method comprising:

a) receiving said first and subsequent addresses identifying said on-line services at an address transmitter from a programming transmitter or from a central office, b) transmitting said first address from said address transmitter located remotely from said computer and said on-line services, c) broadcasting from said programming transmitter first audio or video programming corresponding with said first on-line service, d) coordinating with step of transmitting said first address to one or more audio or video receivers to occur simultaneously with said step of broadcasting first audio or video programming, independent of user interaction with said on-line service, e) receiving said first address at said computer, f) transmitting said subsequent addresses from said address transmitter, g) broadcasting from said programming transmitter second audio or video programming corresponding with said plurality of subsequent on-line services, h) coordinating said step of transmitting said subsequent addresses to occur simultaneously with said step of broadcasting second audio or video programming, i) receiving said subsequent addresses at said computer, and j) said computer automatically accessing said first on-line service by using said first address and automatically and continually accessing said plurality of on-line services by using said subsequent addresses.

34. A method of directing a computer to automatically access information related to audio or video programming simultaneously with the audio or video programming being broadcast from one or more programming transmitters comprising:

a) receiving an address identifying said on-line service at an address transmitter from said programming transmitters or from a central office, b) transmitting said address identifying said on-line location of said on-line service from a paging system, c) coordinating said step of transmitting to occur simultaneously with the broadcasting of the audio or video programming, d) receiving said address at said computer, e) automatically accessing said on-line service by said computer using said address, and e) receiving information related to said radio or television programming at said computer.

35. A system for automatically connecting a computer with multiple on-line services providing information corresponding to audio or video programming being broadcasted comprising:

a) an audio or video programming broadcaster, b) an address transmitter for receiving an address identifying said on-line services from a programming transmitter of from a central office and for transmitting on-line locations of said on-line services, c) a computer connectable to multiple on-line service, and d) a receiver connectable to said computer for receiving transmissions of different addresses from said address transmitter via a communications channel identifying said on-line locations of said on-line services, said address transmitter sending said addresses simultaneously with the programming being broadcast by said broadcaster and said on-line services contain information corresponding with said programming.

36. The system as claimed in claim 35 wherein said address transmitter comprises a paging system.

37. The system as claimed in claim 35 wherein said address transmitter comprises a web site.

38. The system as claimed in claim 37 wherein said communications channel is the Internet.

* * * * *

UNITED STATES PATENT AND TRADEMARK OFFICE
CERTIFICATE OF CORRECTION

PATENT NO. : 5,905,865

DATED : May 18, 1999

INVENTOR(S) : Palmer et al.

It is certified that error appears in the above-identified patent and that said Letters Patent is hereby corrected as shown below:

Column 10, line 20, delete "and/".

Column 10, line 23, delete "and/".

Column 10, line 47, delete "more".

Signed and Sealed this

Fifth Day of October, 1999

*Attest:*

Q. TODD DICKINSON

*Attesting Officer*   *Acting Commissioner of Patents and Trademarks*